United States Patent [19]

Hirabayashi et al.

[11] Patent Number: 5,541,795
[45] Date of Patent: Jul. 30, 1996

[54] TAPE CASSETTE HAVING AN OPEN/CLOSE MECHANISM

[75] Inventors: Koichiro Hirabayashi; Akio Konishi, both of Hirakata, Japan

[73] Assignee: Matsushita Electric Industrial Co., Ltd., Osaka, Japan

[21] Appl. No.: 71,657

[22] Filed: Jun. 3, 1993

[30] Foreign Application Priority Data

Jun. 4, 1992 [JP] Japan ............................ 4-143981

[51] Int. Cl.⁶ .................................. G11B 23/087
[52] U.S. Cl. ........................... 360/132; 242/347.2
[58] Field of Search .................. 360/132; 242/197–200, 242/346–346.2, 347–347.2

[56] References Cited

U.S. PATENT DOCUMENTS

| | | | |
|---|---|---|---|
| 4,449,677 | 5/1984 | Ohta et al. | 360/132 |
| 5,023,740 | 6/1991 | Sasaki | 360/132 |
| 5,065,955 | 11/1991 | Fujii | 242/198 |
| 5,170,962 | 12/1992 | Iwahashi et al. | 242/199 |
| 5,224,004 | 6/1993 | Kondo | 360/132 |

FOREIGN PATENT DOCUMENTS

| | | |
|---|---|---|
| 0452008 | 10/1991 | European Pat. Off. . |
| 61-210590 | 9/1986 | Japan . |
| 63-16825 | 4/1988 | Japan . |
| 63-16824 | 4/1988 | Japan . |
| 63-175279 | 7/1988 | Japan . |
| 2-7280 | 1/1990 | Japan . |
| 167204 | 8/1991 | Japan . |
| 171091 | 10/1991 | Japan . |
| 2163129 | 2/1986 | United Kingdom . |

*Primary Examiner*—Stuart S. Levy
*Assistant Examiner*—George J. Letscher
*Attorney, Agent, or Firm*—Ratner & Prestia

[57] ABSTRACT

A tape cassette including a housing accommodating a pair of tape reels around which a tape is wound, the housing having a front opening at a front face where the tape is exposed in a state of being stretched, and a bottom opening and a top opening which adjoin the front opening; a front cover moving between a closed position opposed to a front face of the tape in the state of being stretched for covering the front opening and an open position for uncovering the front opening; a rear cover moving between a closed position opposed to a rear face of the tape in the state of being stretched for covering the tape and an open position for exposing the tape; a top cover connected to the front cover and to the rear cover and moving between a closed position for covering the top opening and an open position for uncovering the top opening; a first restricting device for controlling the front cover so as to move along a first locus; a second restricting device for controlling the rear cover so as to move along a second locus in association with the movement of the front cover; and a third restricting device for controlling the top cover so as to move along a third locus in association with the movement of the front cover.

21 Claims, 17 Drawing Sheets

5,541,795

TAPE CASSETTE HAVING AN OPEN/CLOSE MECHANISM

BACKGROUND OF THE INVENTION

1. Field of the Invention

The present invention relates to a tape cassette for use in, an image or an audio recording and reproducing apparatus such as a video tape recorder or an external memory apparatus for various data processing devices.

2. Description of the Related Art

Recently in the field of video tape recorders, especially of the ones integrated with a camera, active studies have been made for reducing the size, weight and thickness. An important point in reducing the size and thickness lies in how to reduce the total height of a tape cassette in a state of being mounted in a video tape recorder. When a tape cassette is mounted in a video tape recorder, a front cover of the tape cassette is pivoted to above the tape cassette so as to expose a tape. In order to minimize the height of the tape cassette in this state, various proposals have been made for a mechanism for opening and closing the front cover. Such proposals are described in, for example, Japanese Patent Publication Nos. 63-16824 and 63-16825.

A tape cassette disclosed in Japanese Patent Publication No. 63-16824 will be described with reference to the figures.

FIG. 30 is a perspective view of a conventional tape cassette 19 in a state where a front cover is closed. FIG. 31 is a perspective view of the tape cassette 19 An a state where the front cover As opened. FIG. 32 is a perspective view of a housing 1 of the tape cassette 19 with covers thereof being omitted. FIG. 33 is a cross sectional view of the housing 1 with the covers thereof being omitted. FIG. 34 is a perspective view of a front cover 9 and a top cover 11. FIGS. 35 through 37 are views illustrating an operation for opening the front cover.

As is shown in FIGS. 30 through 37, the tape cassette 19 includes the housing 1, which includes a top half 2 and a bottom half 3. The housing 1 accommodates ,pdates a pair of rotatable tape reels 63 (FIG. 33). A tape 7 is wound around the tape reels 63 and further stretched between a pair of tape guides 8 (FIG. 31) provided on a face of the housing 1. A direction An which the tape 7 is stretched between the tape guides 8 will be referred to as the "tape stretching direction". The housing 1 has a front opening 4 along substantially the total width of the tape cassette 19 at a face where the tape is stretched, a bottom opening 8 and a top opening 6. The bottom opening 5 and the top opening 6 adjoin the front opening 4.

The front opening 4 is covered with a front cover 9 (FIG. 34) including a flat rectangular front portion 9a and a pair of side portions 9b and 9c (FIGS. 30 and 31) extended perpendicular to two side ends in the tape stretching direction of the front portion 9a. The front cover 9 is supported by the housing 1 so as to be pivotal about support pans 10 (only one is shown) each provided on an inner face of the side portion 9b, 9c.

As is shown in FIG. 34, the front cover 9 has a torsion bar 58 formed of a synthetic resin extended in the tape stretching direction along a top end portion 57 thereof. Ends 59 (only one is shown) of the torsion bar 58 are rotatably supported by end portions 60 (only one is shown) of the top end portion 57. A central portion 61 of the torsion bar 58 is fixed to the top end portion 57. In the vicinity of the ends 59 of the torsion bar 58, a top cover 11 is attached to the torsion bar 58 through ends 62 (only one is shown) of the top cover 11. The top cover 11, which covers the top opening 6, slides on the top half 2 in association with the opening operation of the front cover 9 as is shown in FIGS. 35 through 37. In such a construction, when the front cover 9 is pivoted to above the top half 2, the torsion bar 58 is twisted, thereby loading the top cover 11 counterclockwise in FIGS. 35 through 37.

As is shown in FIGS. 35 through 37, the tape 7 is accommodated in a space defined by the front cover 9, an inner plate 12 opposed to a substantially upper half portion of the front cover 9, and a rear cover 13. The rear cover 13 and the top cover 11 are connected to each other so as to be pivotal about support pins 14 and 15 with respect to the front cover 9. The rear cover 13 has projections 16 on a rear face thereof, and the projections 16 each has a guide pin 18 at a tip thereof. Each guide pin 18 is engaged with a guide groove 17 (only one is shown in FIG. 31) provided on an inner face of each tape guide 8 so as to slide along the guide groove 17.

In association with the opening and closing operation of the front cover 9, the top cover 11 and the rear cover 13 are also opened and closed. A locus of the rear cover 13 is always restricted by the sliding movement of the guide pins 18 along the guide grooves 17. In contrast, the top cover 11, which is connected to the front cover 9 through the torsion bar 58, is loaded counterclockwise as mentioned above when The front cover 9 is closed, opened and in the middle of the pivoting operation as is shown in FIGS. 35 through 37. If an external force is applied to the top cover 11 so as to move the top cover 11, the top cover 11 is easily opened or closed. Accordingly, when the tape cassette 19 is mounted in or dismounted from a recording and reproducing apparatus, the top cover 11 is hooked by the apparatus, and thus hampers a smooth mounting or dismounting operation.

As is apparent from FIG. 37, when the front cover 9 is opened, there is made a large recess 64 at bottom of the tape cassette 19. This causes problems in that the tape cassette 19 is hooked by the apparatus and that dust or other foreign objects are allowed to enter the recess 64.

In a case where a small tape cassette which is smaller than a cassette having a size conforming to the apparatus is used, the small tape cassette is accommodated in an adapter before being mounted in the apparatus. FIG. 38 shows the tape cassette 19 accommodated in an adapter 66 as the small tape cassette. A top face of the tape cassette 19 which is exposed does not constitute a flat face with a top face of the adapter 66, there is made a recess 67 at the top face. When the tape cassette 19 is mounted in the apparatus in such a state, a perimeter of the recess 67 is hooked by the apparatus, causing problems that dust or other foreign objects are allowed easy access into the tape cassette 19, smooth mounting and dismounting is hampered, and thus the tape cassette 19 is easily damaged during the mounting and dismounting operation.

SUMMARY OF THE INVENTION

A tape cassette according to the present invention includes a housing accommodating a pair of tape reels around which a tape is wound, the housing having a front opening at a front face where the tape is exposed in a state of being stretched, and a bottom opening and a top opening which adjoin the front opening; a front cover moving between a closed position opposed to a front face of the tape in the state of being stretched for covering the front opening and an open position for uncovering the front opening; a rear cover moving between a closed position opposed to a rear face of the tape in the state of being stretched for covering the tape and an open position for exposing the tape; a top cover connected to the front cover and to the rear cover and moving between a closed position for covering the top opening and an open position for uncovering the top opening; a first restricting device for controlling the front cover so as to move along a first locus; a second restricting device for controlling the rear cover so as to move along a second locus in association with the movement of the front cover; and a third restricting device for controlling the top cover so as o move along a third locus in association with the movement of the front cover.

Alternatively, a tape cassette according to the present invention includes a housing accommodating a pair of tape reels around which a tape is wound, the housing having a front opening at a front face where the tape is exposed in a state of being stretched, a bottom opening and a top opening which adjoin the front opening; a front cover moving between a closed position opposed to a front face of the tape in the state of being stretched for covering the front opening and an open position for uncovering the front opening; a bottom cover moving between a closed position for sealing an inside space of the tape cassette including the front opening, the top opening and the bottom opening and an open position for opening the inside space; a top cover connected to the front cover and to the rear cover and moving between a closed position for covering the top opening and an open position for uncovering the top opening; a first restricting device for controlling the front cover so as to move along a first locus; a second restricting device for controlling the bottom cover so as to move along a second locus in association with the movement of the front cover; a first connecting device for pivotally connecting the top cover and the front cover; and a second connecting device for pivotally connecting the top cover and the bottom cover.

Thus, the invention described herein makes possible the advantages of providing a tape cassette in which an opening and closing operation of a front cover is associated with an opening and closing operation of a top cover and a rear cover, end loci of the front, top and the rear covers are restricted as specified, so as to be smoothly mounted in and dismounted from a recording end reproducing apparatus without being damaged or polluted with dust or other foreign objects.

These and other advantages of the present invention will become apparent to hose skilled in the art upon reading and understanding the following detailed description with reference to the accompanying figures.

BRIEF DESCRIPTION OF THE DRAWINGS

FIG. 12 is a side view of the tape cassette 41a.

DESCRIPTION OF THE PREFERRED EMBODIMENTS

Hereinafter, the present invention will be described by way of illustrating examples with reference to the accompanying drawings.

EXAMPLE 1

A tape cassette according to a first example of the present invention will be described with reference to the figures.

Figure 1:
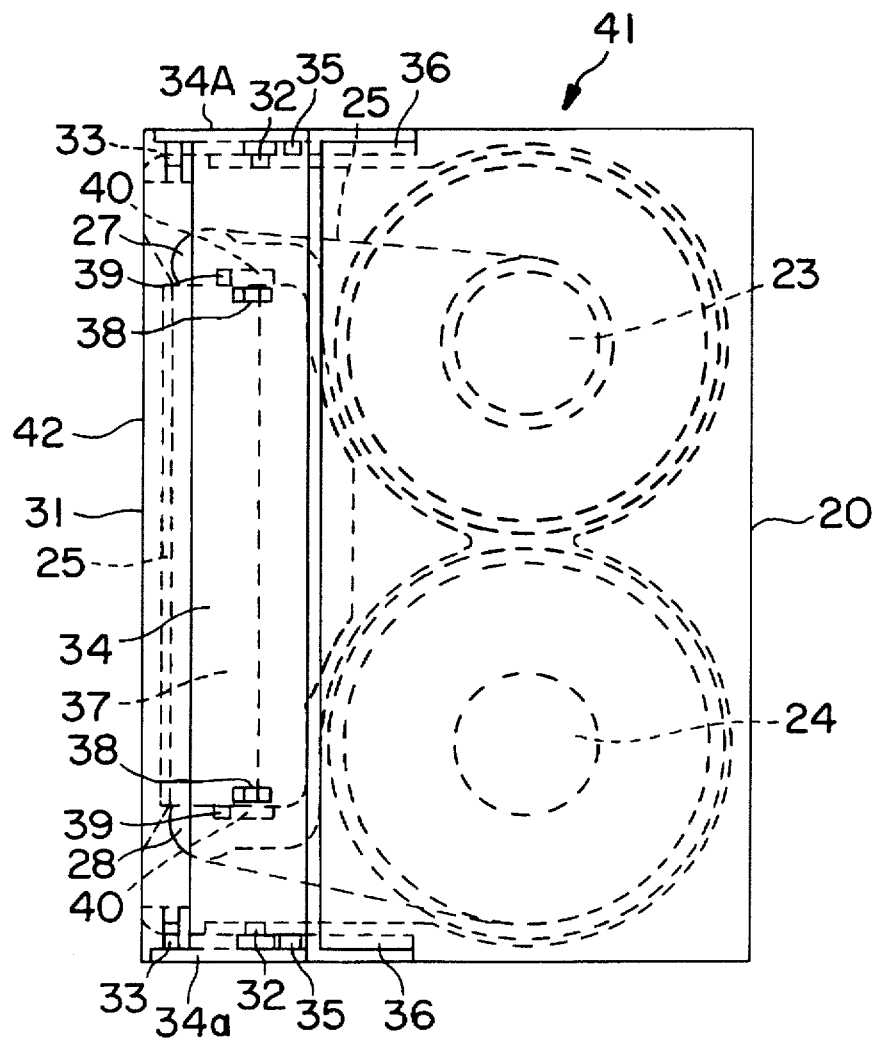
FIG. 1 is a plan view of a tape cassette 41 according to a first example of the present invention.
Figure 2:
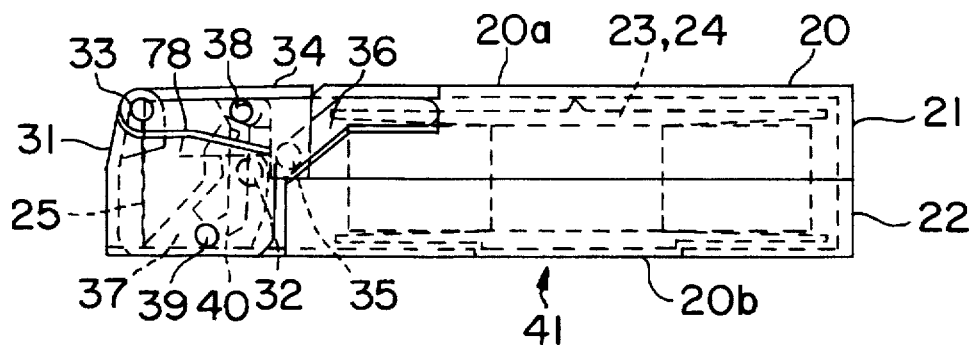
FIG. 2 is a side view of the tape cassette 41.
Figure 3:
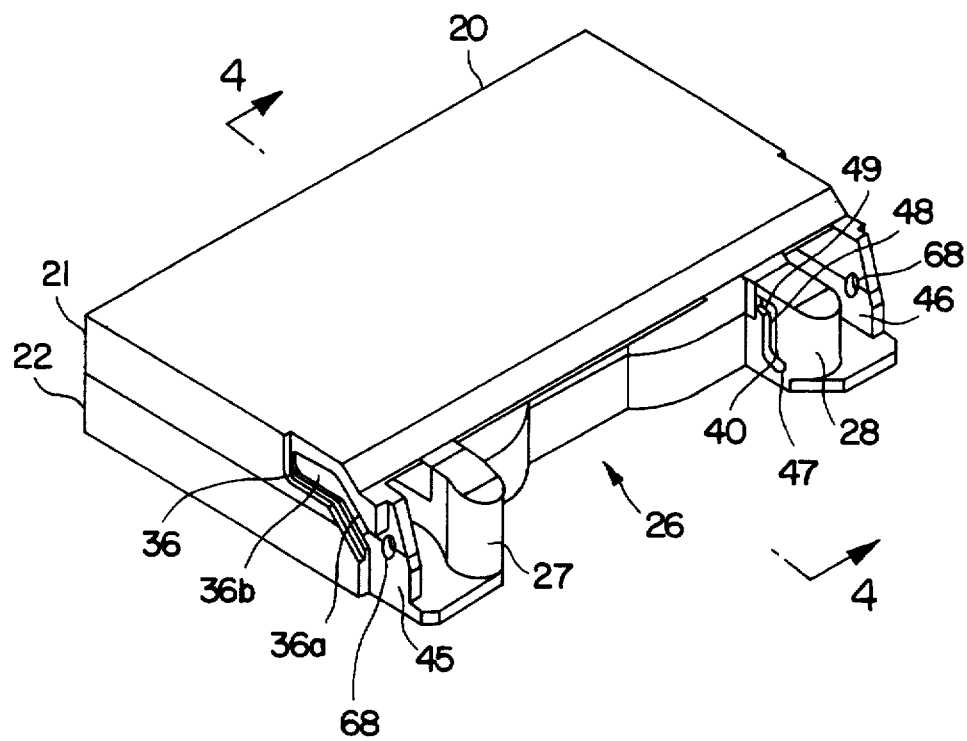
FIG. 3 is a perspective view of a housing 20 of the tape cassette 41 with covers thereof being omitted.
Figure 4:
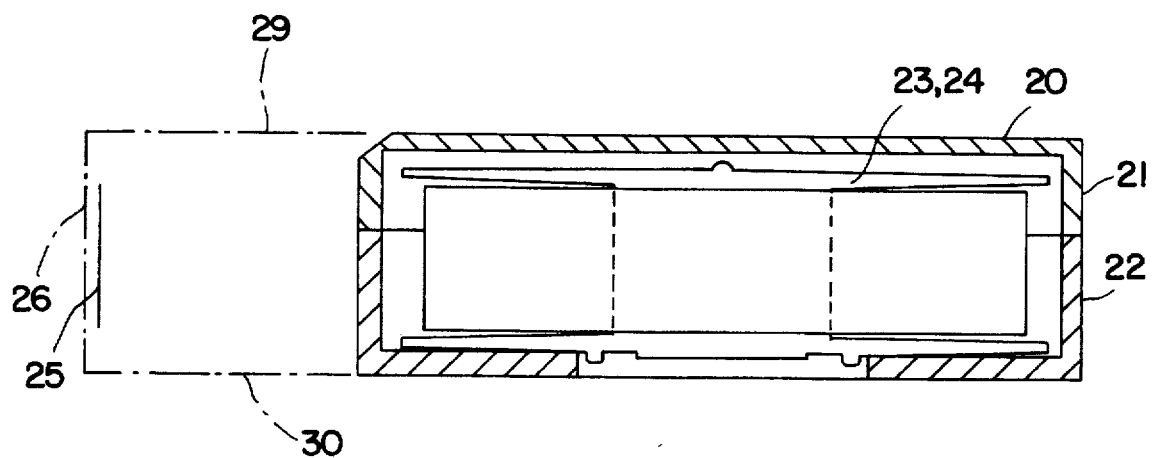
FIG. 4 is a cross sectional view taken along lines X4—X4 of FIG. 3.
Figure 5:
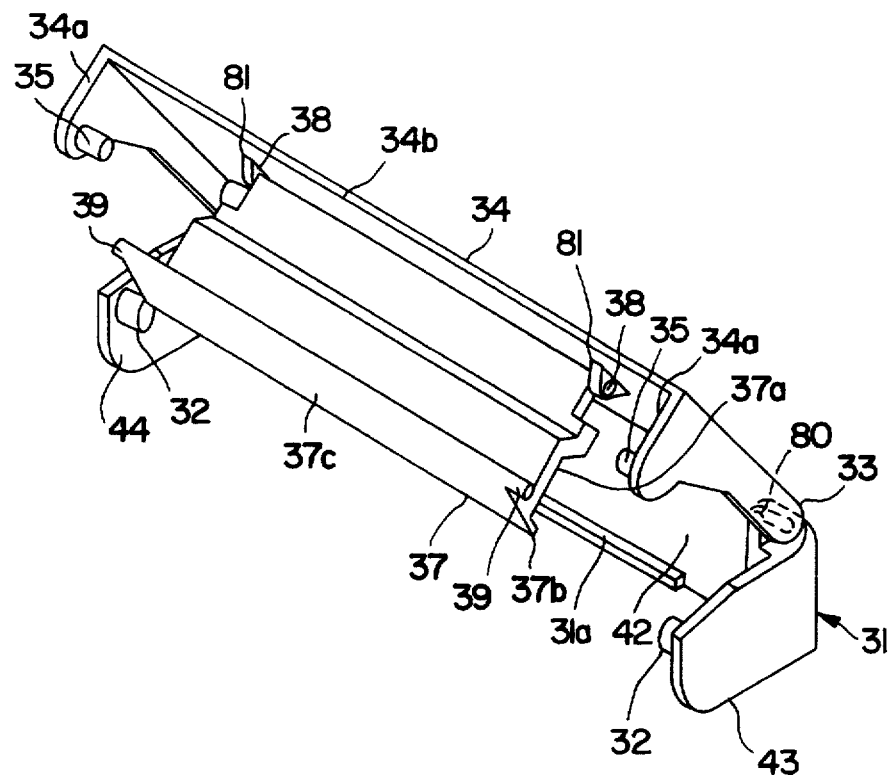
FIG. 5 is a perspective view illustrating e construction of a front cover 31, a top cover 34, and a rear cover 37.

FIG. 1 is a plan view of a tape cassette 41 according to the first example of the present invention. FIG. 2 is a side view thereof. FIG. 3 is a perspective view of a housing 20 of the tape cassette 41 with covers thereof being omitted. FIG. 4 is a cross sectional view taken along lines X4—X4 of FIG. 3. FIG. 5 is a perspective view illustrating a construction of a front cover 31, a top cover 34, and a rear cover 37.

As is shown in FIGS. 1 through 5, a housing 20 includes a top half 21 and a bottom half 22 which are assembled together. The housing 20 accommodates a pair of rotatable tape reels 23 and 24. A magnetic tape 25 is wound around the tape reels 23 and 24 and further stretched between a pair of tape guides 27 and 28 provided on a face of the housing 20.

Hereinafter, a direction in which the magnetic tape 25 is stretched between the tape guides 27 and 28 will be referred to as the "tape stretching direction". A face of the housing 20 where the magnetic tape 25 is stretched as mentioned above will be referred to as the "front" face. The side of the tape cassette, the housing 20 or elements thereof which is close to the "front face" will be referred to as "front", and the side thereof opposite to "front" will be referred to as "rear". The top side in FIG. 2 will be referred to as "top", and the lower bottom side in FIG. 2 will be referred to as "bottom".

The housing 20 has a front opening 26 (FIG. 3) along substantially the total length of the tape cassette 19 in the tape stretching direction at he front face. The housing 20 further has a top opening 29 (FIG. 4) in the vicinity of a top face 20a of the housing 20 and a bottom opening 30 in the vicinity of a bottom face 20b of the housing 20. The top opening 29 and the bottom opening 30 adjoin the front opening 26.

The front opening 26 is covered with a front cover 31 shown in FIG. 5. The front cover 31 includes a flat rectangular portion 42 opposed to the front opening 26, a pair of side portions 43 and 44 extended perpendicular to two side ends in the tape stretching direction of the front portion 42. The front portion 42 has a lengthy projection 31a extended in the tape stretching direction along a bottom end portion on a rear face thereof. The side portions 43 and 44 each has a support pin 32 projecting inward on an inner face thereof, the support pin 32 integrally formed with the side portion 43, 44. The support pins 32 are respectively engaged with through-holes 68 (FIG. 3) formed at walls 45 and 46 projecting forward at two side ends in the tape stretching direction of the front face of the housing 20. This engagement supports the front cover 31 to the housing 20.

The top opening 29 is covered with a top cover 34. The top cover 34 includes a main portion 34b having such a shape that covers the top opening 29 and a pair of side portions 34a extended perpendicular to two side ends in the tape stretching direction of the main portion 34b. Each side portion 34a has a support pin 33 (only one is shown) projecting inward on an inner face thereof and is rotatably engaged with a bracket 80 projecting from the front cover 31 toward the top cover 34. (Only one bracket 80 is shown in FIG. 5.) By this engagement, the top cover 34 is pivotally connected with the front cover 31.

Figure 6:
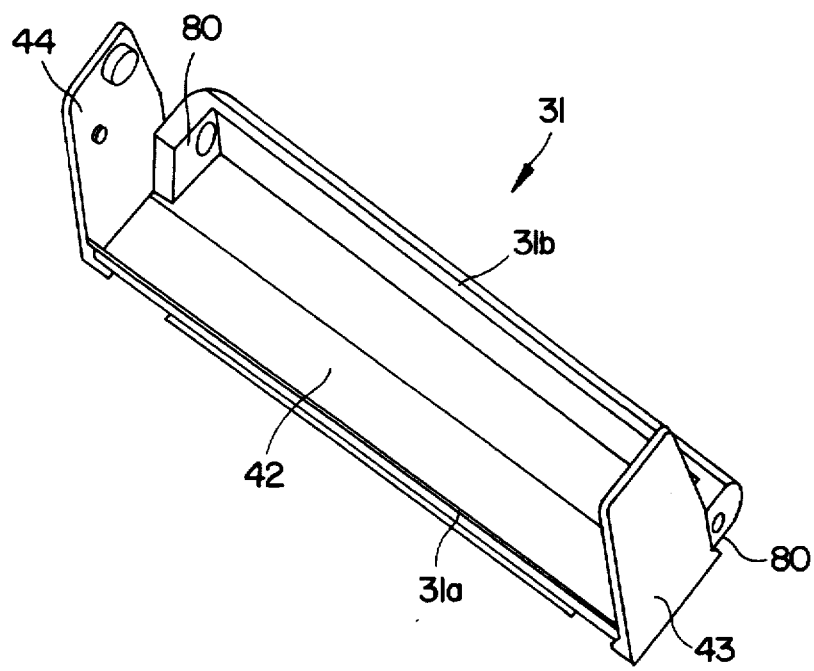
FIG. 6 is a perspective view of the front cover 31 seen from a bottom face thereof.

As is shown in FIG. 6, the front portion 42 of the front cover 31 has another projection 31b projecting inward and extended along substantially the total length of an end portion thereof opposed to the top cover 34. The projection 31b has, for example, such a curved face that forms a portion of an outer peripheral face of a cylinder. The projection 31b covers a gap between he front cover 31 and the top cover 34 in a state where the front cover 31 is closed. The projection 31b is provided for the following reason. The front cover 31 is disposed so that an end portion of the top cover 34 opposed to the front cover 31 and the end portion of he front cover 31 opposed to the top cover 34 are close to each other at a maximum extent in the state when the front cover 31 is opened. If the projection 31b is eliminated, the front cover 31 and the top cover 34 have a gap therebetween in the state where he front cover 31 is closed. Such a gap allows easy access for dust and other foreign objects into a space defined by the front cover 31, the top cover 34 and the rear cover 37, as a result of which the magnetic tape 25 is damaged or malfunction. The projection 31b is provided in order to prevent such inconveniences.

Each side portion 34a has a guide pin 35 projecting inward on the inner face thereof, the guide pin 35 being integrally formed with the side portion 34a. The guide pins 35 are respectively engaged with guide grooves 36 (only one is shown in FIG. 3) formed at two side faces of the top half 21, so as to slide along the grooves 36. Each guide groove 36 includes a slanting section 36a diagonally rearward from a front bottom end of the side face and a horizontal section 36b adjoining the slanting section 36a and horizontally extended rearward. Each guide groove 36 has the upper tip thereof at such a position that allows the top cover 34 to be positioned in the vicinity of or on the top face 20a of the top half 21 in a state where the front cover 31 is opened.

The rear cover 37 is provided so as to cover a rear face of the magnetic tape 25. As is shown in FIG. 5, the rear cover 37 has a first end portion pivotally connected to the top cover 34 and a second end portion contactable to the projection 31a of the front cover 31. The rear cover 37 has a pair of support pins 38 projecting outward at two side ends in the tape stretching direction of the first end portion, the support pins 38 being integrally formed with the rear cover 37. The rear cover 37 further includes a bottom plate 37c at the second end portion integrally formed therewith, the bottom plate 37c covering a large area of the bottom opening 30. The bottom plate 37c has a pair of guide pins 39 projecting outward at two side ends in the tape stretching direction of a rear end portion thereof, the guide pins 39 being integrally formed with the bottom plate 37c.

The bottom plate 37c further has a projection 37b along a front end portion thereof. The projection 37b has a similar length with that of the projection 31a and projects toward the projection 31a. The front cover 31 and the rear cover 37 are opposed to each other in a state of being distanced from each other by he projections 31a and 37b, and the magnetic tape 25 is accommodated in e space defined by the front cover 31 and the rear cover 37. The main portion 34b of the top cover 34 has a pair of brackets 81 projected thereon, and the rear cover 37 is pivotally connected to the top cover 34 through the engagement of the support pins 38 and the brackets 81. The guide pins 39 are slidably engaged with guide grooves 40 (only one is shown in FIG. 3) respectively formed at inner faces of the tape guides 27 and 28.

Each guide groove 40 includes a slanting section 47 diagonally raised rearward from a front bottom end of the tape guide 27, 28, a vertical section 48 adjoining the slating section 47 and vertically extended upward, and a horizontal section 49 adjoining the vertical section 48 and horizontally extended rearward. Each guide groove 40 has the upper tip thereof at such a position that allows the rear cover 37 to be positioned in the vicinity of or on the top face 20a of the top half 21 in a state where the front cover 31 is opened.

The front cover 31 is always loaded in a direction of being closed by a torsion spring 78 (FIG. 2) and further is structured so as not to be easily opened or closed unless a locking mechanism (not shown) is unlocked.

An operation for opening the front cover 31 of the tape cassette 41 having the above-described construction will be described with reference to the figures.

Figure 7:
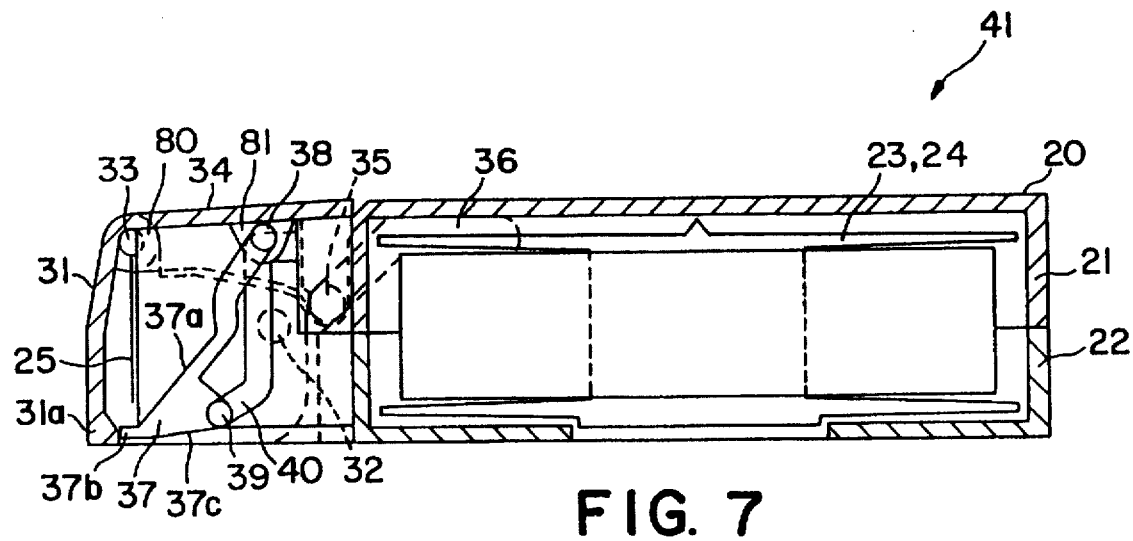
FIG. 7 is a cross sectional view of the tape cassette 41 in a state where the front cover 31 is closed.
Figure 8:
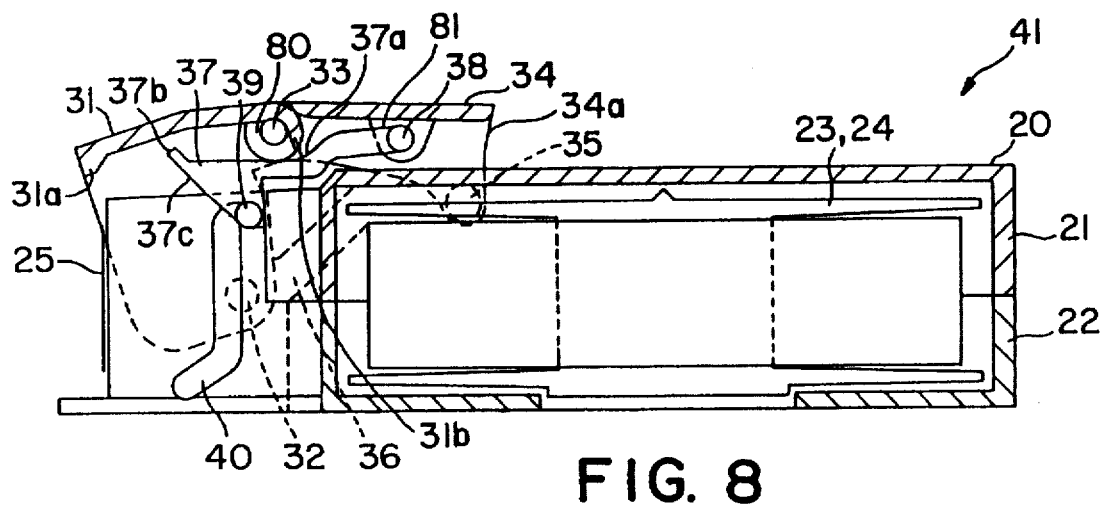
FIG. 8 is a cross sectional view of the tape cassette 41 in a state where the front cover 31 is opened.
Figure 9:
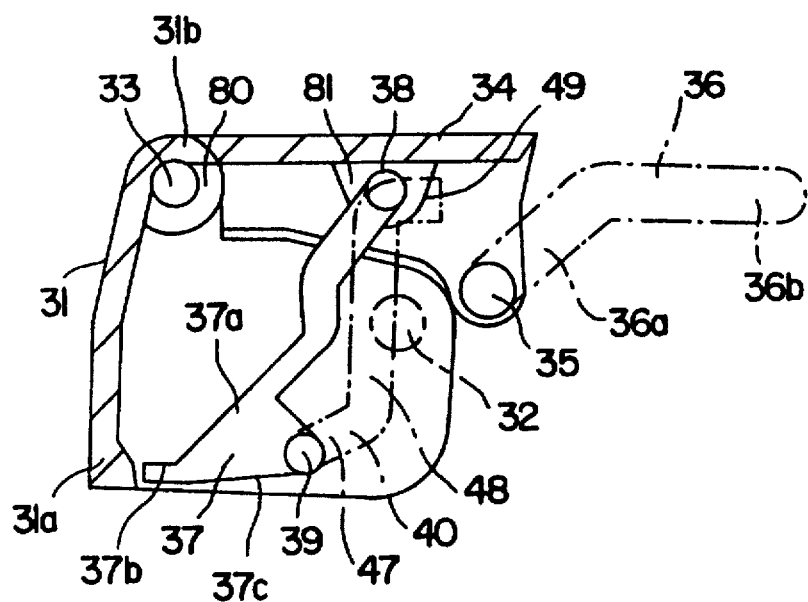
FIG. 9 is a partial, enlarged view of FIG. 7.
Figure 10:
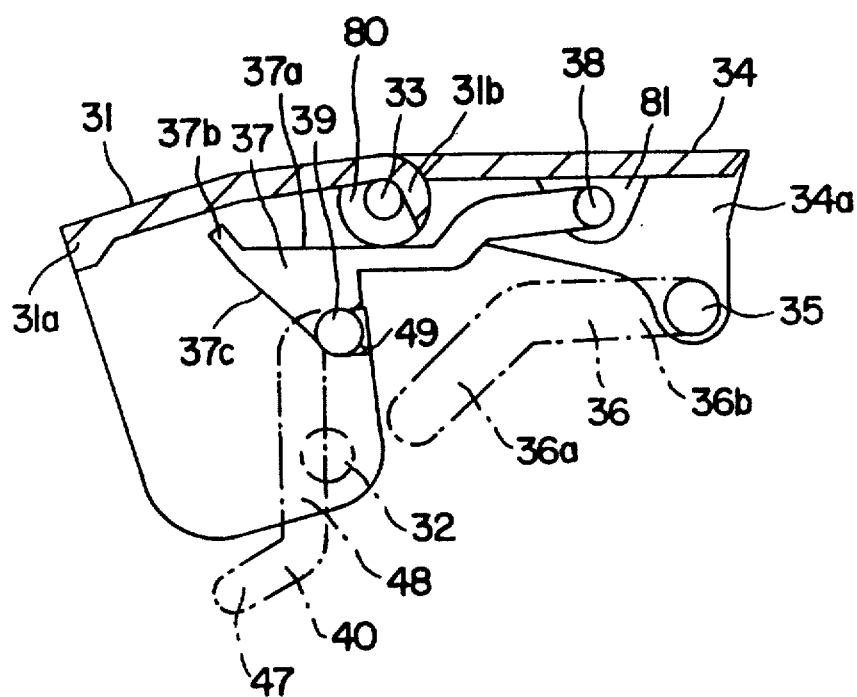
FIG. 10 is a partial, enlarged view of FIG. 8.

FIG. 7 is a cross sectional view of the tape cassette 41 in a state where the front cover 31 is closed. FIG. 8 is a cross sectional view thereof in a state where the front cover 31 is opened. FIGS. 9 and 10 are enlarged views of FIGS. 7 and 8, respectively.

As is shown in FIGS. 7 through 10, when the front cover 31 is closed, the magnetic tape 25 is accommodated in a space defined by the front cover 31, the top cover 34 and the rear cover 37. Due to the projections 31a and 37b, the magnetic tape 25 stays out of direct contact from the front cover 31 and the rear cover 37.

When the front cover 31 is pivoted clockwise about the support pins 32, each guide pin 35, in association, slides to diagonally rise rearward along the slating section 36a of the guide groove 36, and then slides horizontally rearward along the horizontal section 36b. Accordingly, the top cover 34 is diagonally raised rearward to above the top face 20a of the top half 21 and then moves horizontally rearward. In association with the movement of the top cover 34, the rear cover 37 is diagonally raised rearward. Since each guide pin 39 provided on the rear cover 37 slides along the slating section 47, the vertical section 48 and the then horizontal section 49 of the guide groove 40, the rear cover 37 first moves away from the rear face of the magnetic tape 25, then moves upward, and moves horizontally to the position shown in FIG. 8. While he rear cover 37 is moved upward, the projection 37b is pivoted so as to approach the front opening 26.

When the front cover 31 is completely opened, the front cover 31, the top cover 34 and the rear cover 37 are above the top face 20a of the top half Accordingly, there is made a large space formed of the front opening 26, the top opening 29 and the bottom opening 30. Thus, when the tape cassette 41 is completely mounted in a recording end reproducing apparatus, cylinders and loading posts of the apparatus are easily inserted into the tape cassette 41. Moreover, the total height of the tape cassette 41 in a state of being mounted is minimized, thus significantly contributing to the reduction in size of he apparatus. The front cover 31, the top cover 34 and he rear cover 37 are operated in association with one another, and the loci of these three covers are always restricted by the support pins 32 and the guide grooves 36 and 40. Because of such a construction, the top cover 34 is prevented from being opened or closed by an external force or being hooked by the apparatus during the mounting and dismounting operation.

When the front cover 31 is pivoted counter-clockwise in FIGS. 7 and 8 by a force of the torsion spring 78 by, for example, the dismounting operation of the tape cassette 41 from the apparatus, the guide pins 35 and 39 respectively slide along the guide grooves 36 and 40 in an opposite direction to the direction mentioned above. Thus, the tape cassette 41 returns to the state shown in FIG. 7. In this operation also, the front cover 31, the top cover 34 and the rear cover 37 move in association with one another, and the loci of these three covers are always restricted by the support pins 32 and the guide grooves 36 and 40. For these reasons, the same effects are achieved in the closing operation of the front cover 31 as in the opening operation thereof.

As has been described, the tape cassette 41 in the first example is smoothly mounted to and dismounted from a recording and reproducing apparatus without being damaged. Since a large area of the bottom opening 30 is covered with the bottom plate 37c of the rear cover 37, the inside of the tape cassette 41 is protected from dust or other foreign objects. Since the combination of the projection 31a of the front cover 31 and the projection 37b of the rear cover 37 allows the accommodation of the magnetic tape 25 with no direct contact with the front cover 31 or the rear cover 37 and further the projection 37b is first moved away from the magnetic tape in accordance with the slanting section 47, the magnetic tape 25 is not damaged when the front and the rear covers 31 and 37 are opened or closed.

EXAMPLE 2

A tape cassette according to a second example of the present invention will be described with reference to the figures. Identical members with those of the first example bear identical reference numerals.

Figure 11:
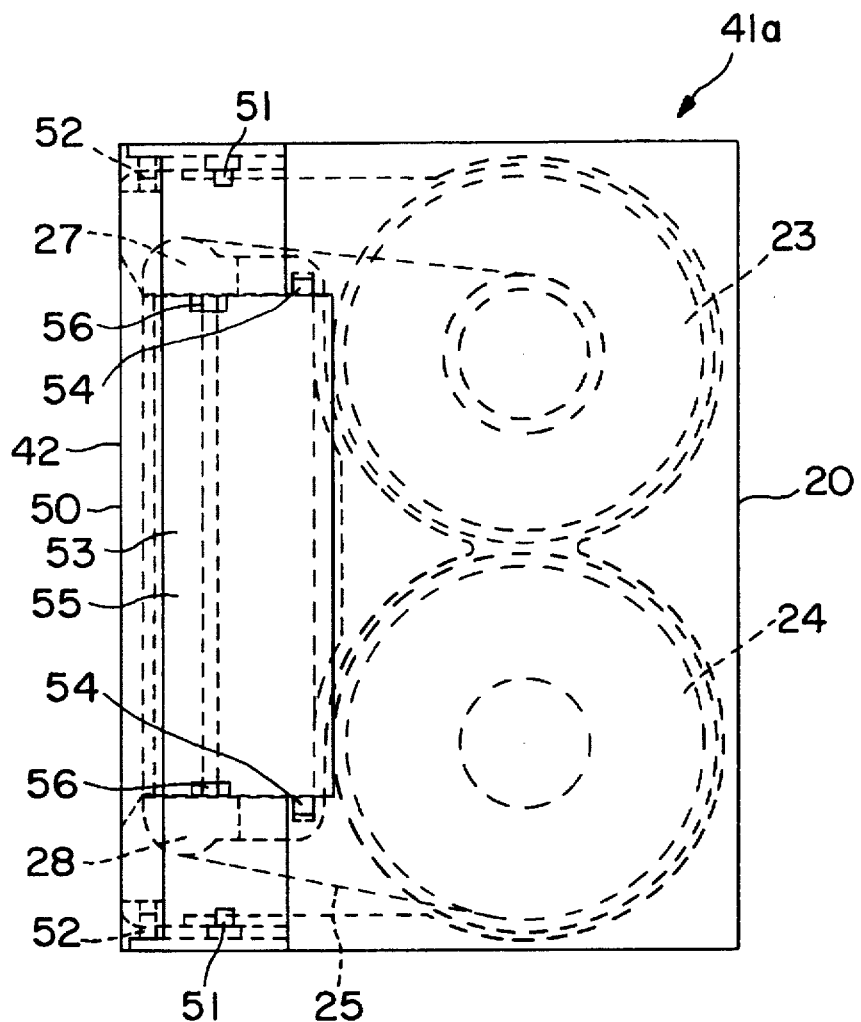
FIG. 11 is a plan view of a tape cassette 41a according to a second example of the present invention.
Figure 12:
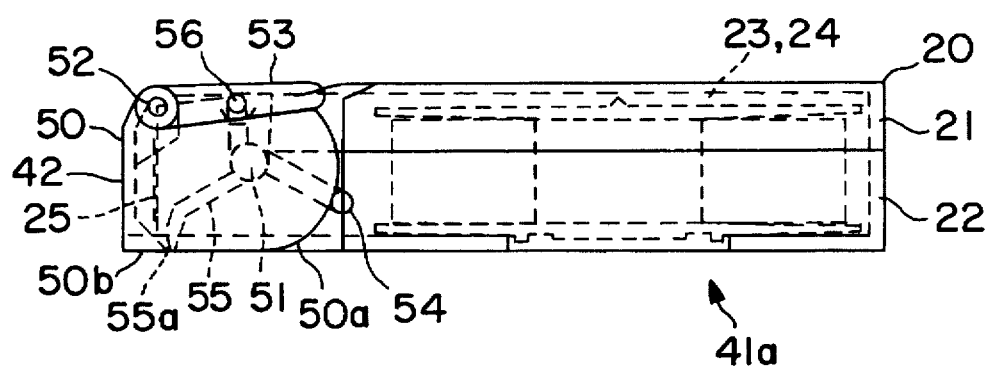
Figure 13:
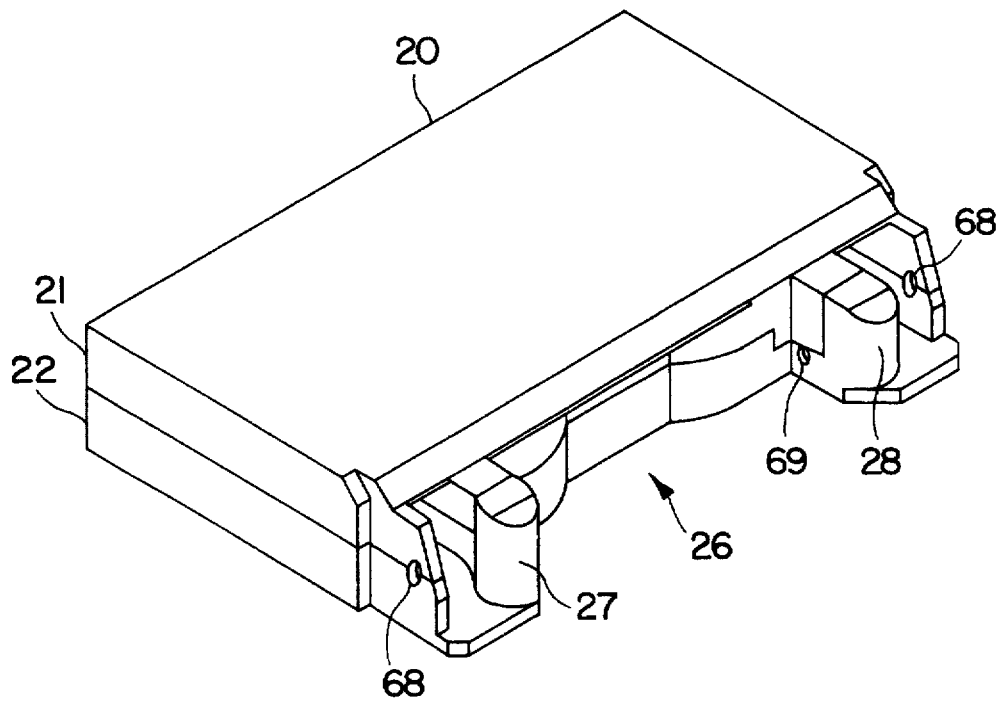
FIG. 13 is a perspective view of a housing 20 of the tape cassette 41a with covers thereof being omitted.
Figure 14:
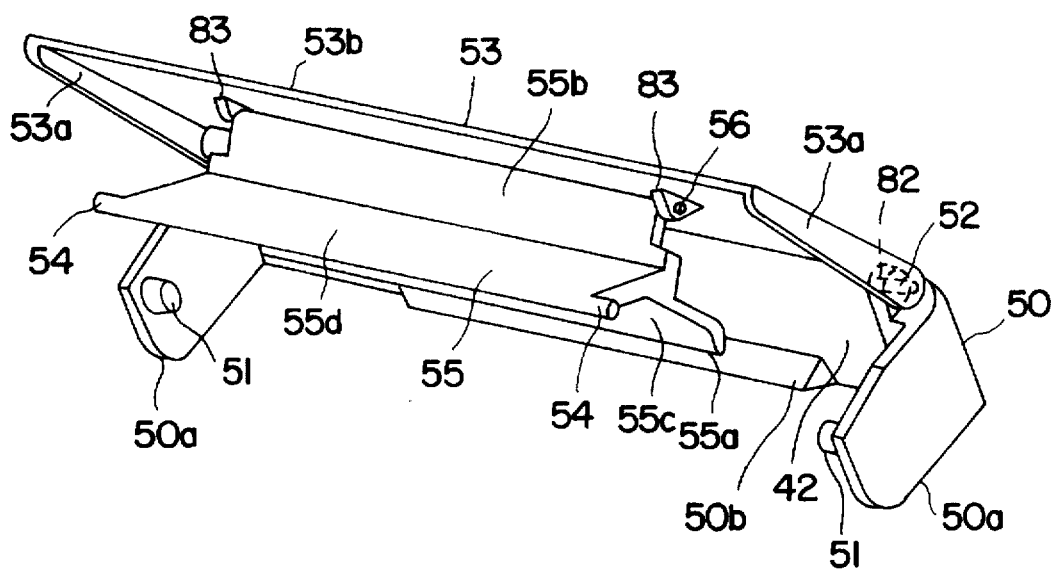
FIG. 14 is a perspective view illustrating a construction of a front cover 50, a top cover 53, and a bottom cover 55.

FIG. 11 is a plan view of a tape cassette 41a according to the second example of the present invention. FIG. 12 is a side view thereof. FIG. 13 is a perspective view of a housing 20 of the tape cassette 41a with covers thereof being omitted. FIG. 14 is a perspective view illustrating a construction of a front cover 50, a top cover 53, and a rear cover 55.

The front opening 26 of the housing 20 is covered with a front cover 50 shown in FIG. 14. The front cover 50 includes a flat rectangular portion 42 opposed to the front opening 26, a pair of side portions 50a extended perpendicular to two side ends in the tape stretching direction of the front portion 42. The front portion 42 has a lengthy projection 50b extended in the tape stretching direction along a bottom end portion on a rear face thereof. The side portions 50a each has a support pin 51 projecting inward on an inner face thereof, the support pin 51 integrally formed with the side portion 50a. The support pins 51 are respectively engaged with through-holes 68 (FIG. 13) formed in the housing 20. This engagement supports the front cover 50 to the housing 20.

The top opening 29 is covered with a top cover 53. The top cover 53 includes a main portion 53b having such a shape that covers the top opening 29 and a pair of side portions 53a extended perpendicular to two side ends in the tape stretching direction of the main portion 53b. Each side portion 53a has a support pin 52 (only one is shown) projecting inward on an inner face thereof and is rotatably engaged with a bracket 82 projecting from the front cover 50 toward the top cover 53. (Only one bracket 82 is shown in FIG. 14.) By this engagement, the top cover 53 is pivotally connected with the front cover 50.

The bottom opening 30 is covered with a bottom cover 55 held to the housing 20. As is shown in FIG. 14, the bottom cover 55 includes three plates 55b, 55c and 55d radially connected to one another. The plate 55d has a pair of support pins 54 projecting outward from two side ends in the tape stretching direction of a rear end portion thereof. The thereof support pins 54 are engaged with a pair of holes 69 (only one is shown in FIG. 13) respectively formed at inner faces of the tape guides 27 and 28. By this engagement, the bottom plate 55 is supported by the housing 20.

The plate 55b has a pair of support pins 56 (only one is shown) at two side ends in the tape stretching direction of an upper end portion thereof. Each support pin 56 is pivotally engaged with a bracket 83 formed on the main body 53b of the top cover 53. The plate 55c has a tip portion 55a extended in the tape stretching direction and projecting downward. When the front cover 50 is closed, the tip portion 55a is in contact with the projection 50b of the front cover 50. The plates 55c and 55d seal an inside space of the tape cassette 41a including the front opening 26, the top opening 29 and the bottom opening 30.

An operation for opening the front cover 50 of the tape cassette 41a having the above-described construction will be described with reference to the figures.

Figure 15:
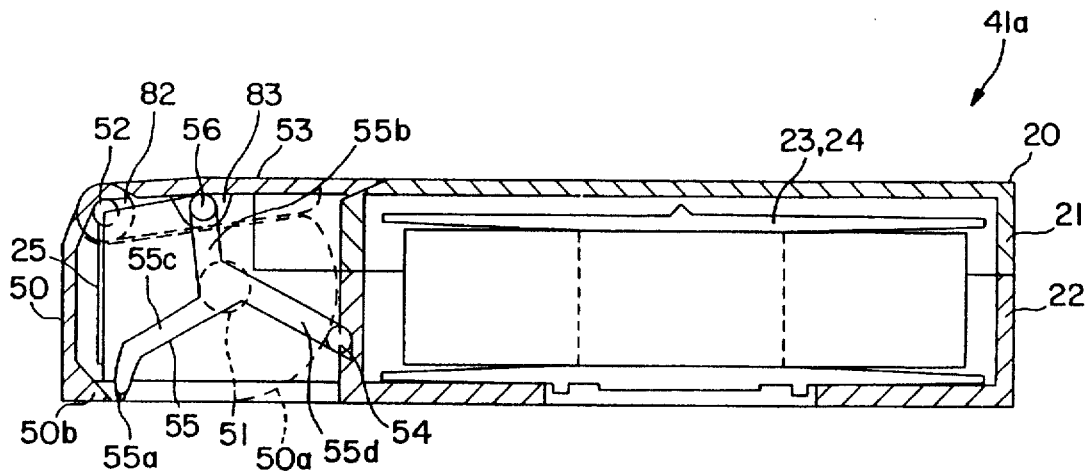
FIG. 15 is a cross sectional view of the tape cassette 41a in a state where the front cover 50 is closed.
Figure 16:
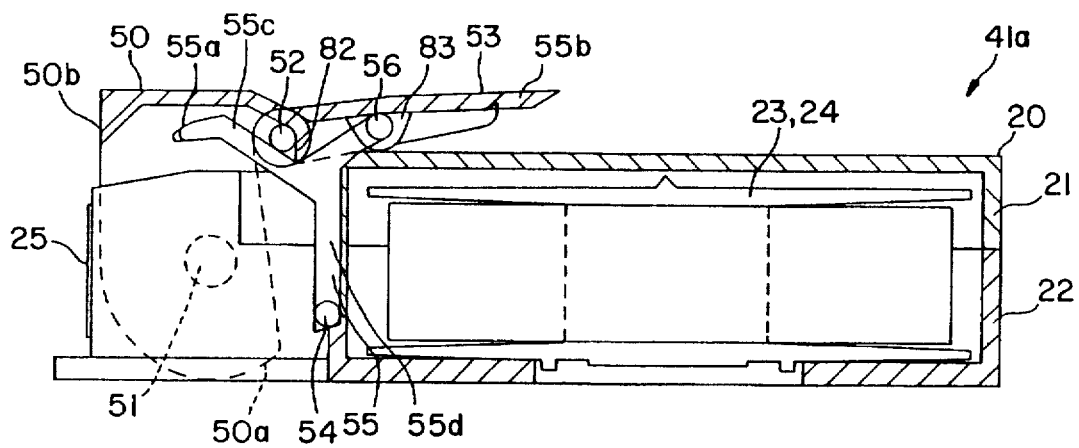
FIG. 16 is a cross sectional view of the tape cassette 41a in a state where the front cover 50 is opened.
Figure 17:
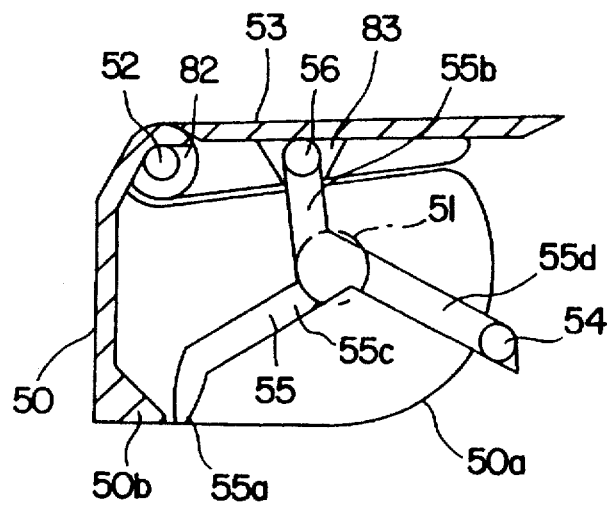
FIG. 17 is a partial, enlarged view of FIG. 15.
Figure 18:
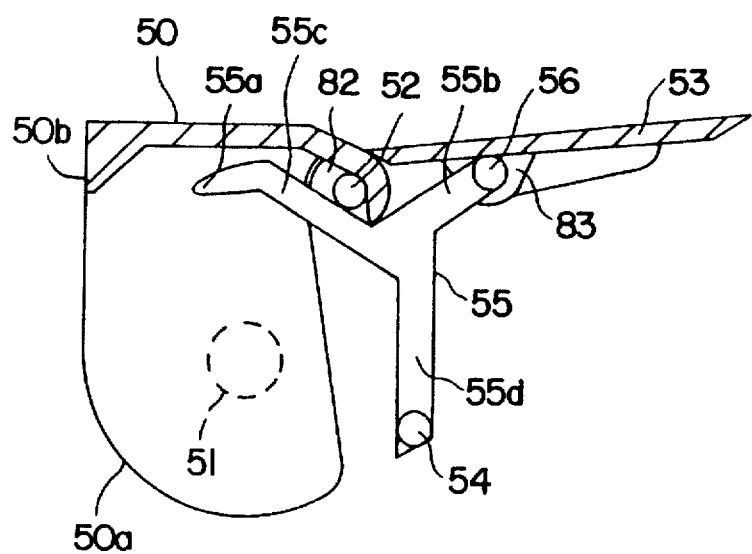
FIG. 18 is a partial, enlarged view of FIG. 16.

FIG. 15 is a cross sectional view of the tape cassette 41a in a sate where the front cover 50 is closed. FIG. 16 is a cross sectional view thereof in a state where the front cover 50 is opened. FIGS. 17 and 18 are enlarged views of FIGS. 15 and 16, respectively.

As is shown in FIGS. 15 through 18, when the front cover 50 is closed, the magnetic tape 25 is accommodated in a space defined by the front cover 50, the top cover 53 and the bottom cover 55. Due to the projection 50b and the tip portion 55a, the magnetic tape 25 stays out of direct contact from the front cover 50 and the bottom cover 55. Since the bottom opening 30 is sealed by the plates 55c and 55d of the bottom cover 55 as is mentioned above, the inside of the tape cassette 41a is protected from dust or other foreign objects.

When the front cover 50 is pivoted clockwise about the support pins 51, the top cover 53 connected to the front cover 50 through the support pins 52 is pressed and thus diagonally raised by the front cover 50 rearward and then moves along the top face 20a of the top half 21. The bottom cover 55 connected to the top cover 53 through the support pins 56 is pivoted clockwise about the support pins 54 as is shown in FIGS. 17 and 18. Along such a movement of the bottom cover 55, the tip portion 55a of the plate 55c moves away from the rear face of the magnetic tape 25 to above the top face 20a (FIG. 16).

When the front cover 50 is completely opened, the front cover 50, the top cover 53 and the bottom cover 55 are above the top face 20a of the top half 21. Accordingly, there is made a large space formed of the front opening 26, the top opening 29 and the bottom opening 30. Thus, when the ape cassette 41a is completely mounted in a recording and reproducing apparatus, cylinders and loading posts of the apparatus are easily inserted into the tape cassette 41a. Moreover, the total height of the tape cassette 41a in a state of being mounted is minimized, thus significantly contributing to the reduction in size of the apparatus. The front cover 50, the top cover 53 and the bottom cover 55 are operated in association with one another, and the loci of these three covers are always restricted by the connection with each other. Because of such a construction, the top cover 50 is prevented from being opened or closed by an external force or being hooked by the apparatus during the mounting and dismounting operation.

When the front cover 50 is pivoted counter-clockwise in FIGS. 15 and 16 by a force of the torsion spring 78 by, for example, the dismounting operation of the tape cassette 41a from the apparatus, the top cover 53 and the bottom cover 55 move in an opposite direction to the direction mentioned above. Thus, the tape cassette 41a returns to the state shown in FIG. 15. In this operation also, the front cover 50, the top cover 53 and the bottom cover 55 move in association with one another, and the loci of these three covers are always restricted by the connection with each other. For these reasons, the same effects are achieved in the closing operation of the front cover 50 as the opening operation thereof.

As has been described, the tape cassette 41a in the second example is smoothly mounted to and dismounted from a recording and reproducing apparatus without being damaged. Since the bottom opening 30 is covered with the bottom cover 58, the inside of the tape cassette 41a is protected from dust or other foreign objects. Since the combination of the projection 50b of the front cover 50 and the tip portion 55a of the bottom cover 55 allows the accommodation of the magnetic tape 25 with no direct contact with the front cover 50 or the bottom cover 55, the magnetic tape 25 is not damaged when the front and the bottom covers 50 and 55 are opened or closed.

Figure 19:
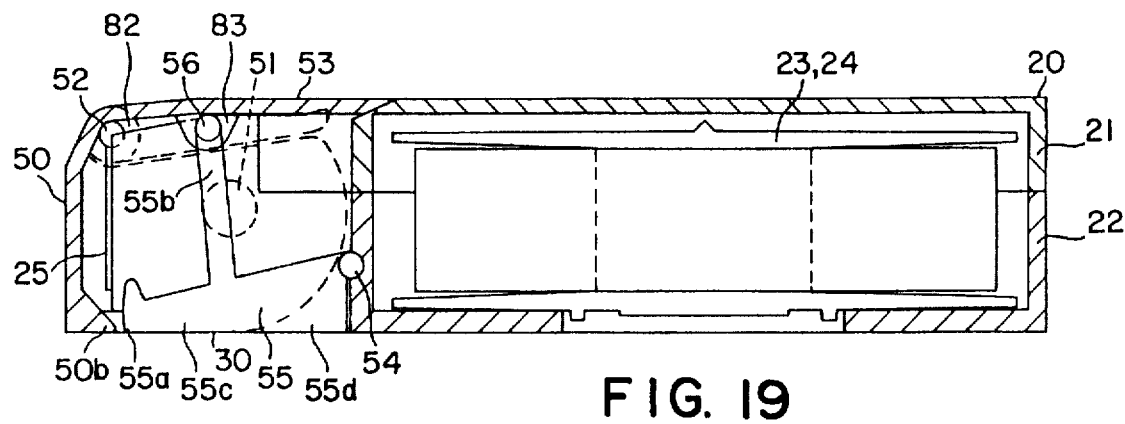
FIG. 19 is a cross sectional view of a tape cassette according to e modification of the second example in a state where the front cover 31 is closed.
Figure 20:
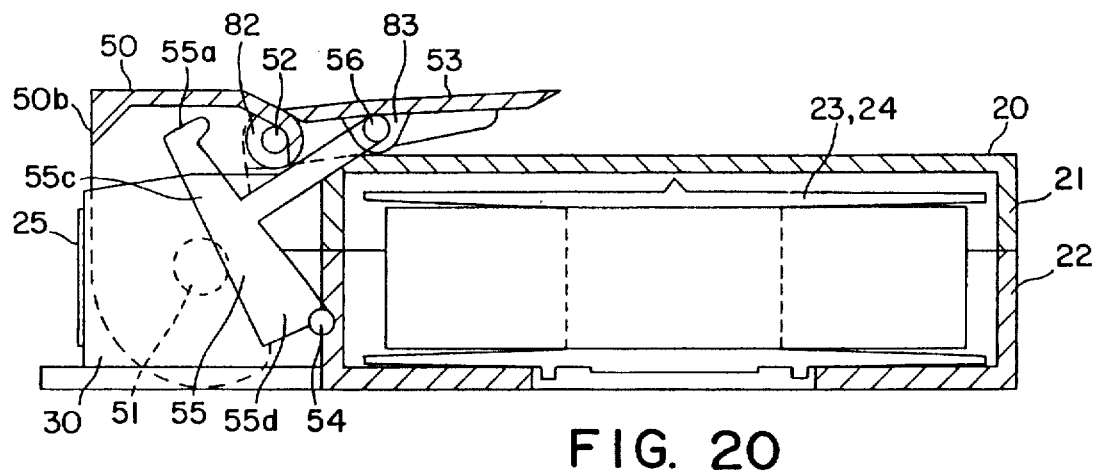
FIG. 20 is a cross sectional view of the tape cassette shown in FIG. 19 in a state where front cover 31 is opened.

FIGS. 19 and 20 show a tape cassette according to a modification of the second example. In this modification, bottom faces of the plate 55c and 55d of the bottom cover 55 which seal the inside opening of the tape cassette 41a constitute a flat face. Further, the bottom faces of the plate 55c and 55d and the bottom face 20b of the bottom half 22 constitute a substantially flat face.

Such a construction prevents formation of a recess at the bottom of the tape cassette when the front cover 50 is closed. Such a flat bottom face realizes a significantly better appearance. Further, since the whole opening formed of he front, top and bottom openings 26, 29 and 30 is completely sealed, the tape cassette is prevented from being hooked by a recording and reproducing apparatus during the mounting and dismounting operation, end the inside of the tape cassette is protected from dust or other foreign objects.

EXAMPLE 3

A tape cassette according to a third example of the present invention will be described with reference to the figures. Identical members with those of the first example bear identical reference numerals.

Figure 21:
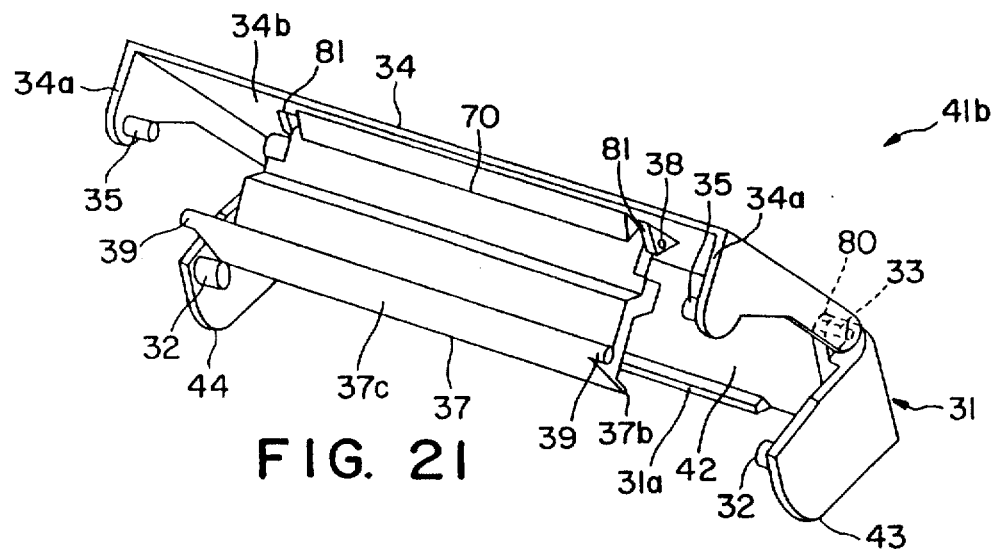
FIG. 21 is a perspective view illustrating the front cover 31, the top cover 34 and the cover 37 of a tape cassette 41b according to a third example of the present invention.
Figure 22:
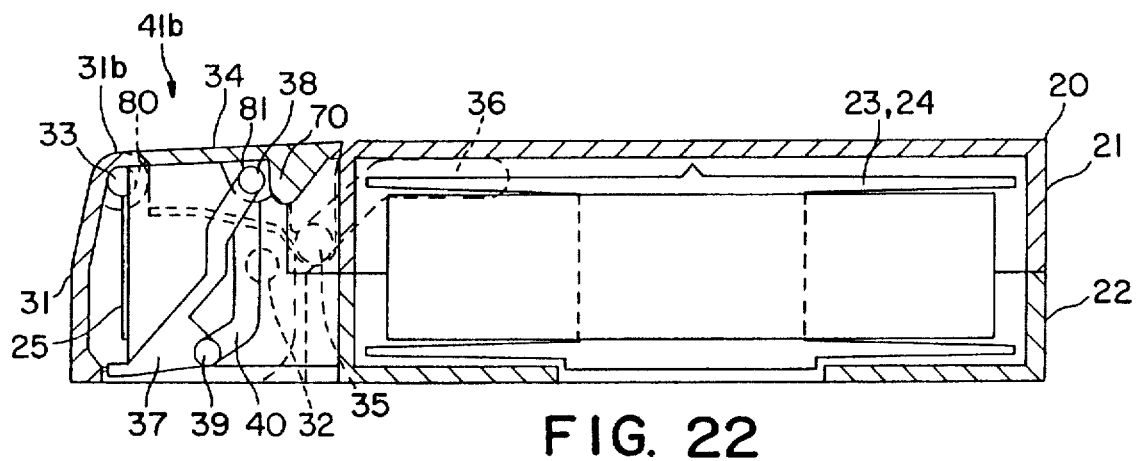
FIG. 22 is a cross sectional view of the tape cassette 41b in a state where the front cover 31 is closed.
Figure 23:
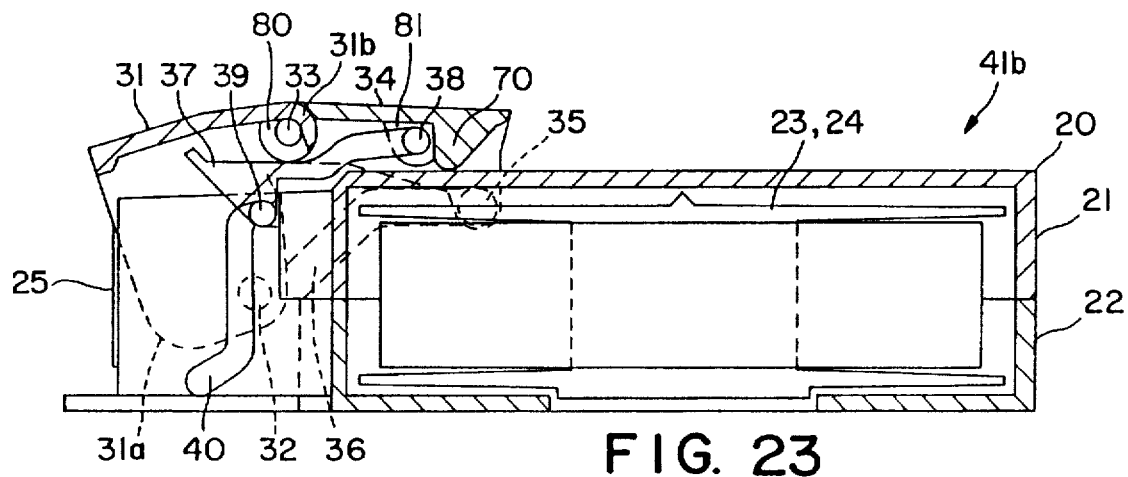
FIG. 23 is a cross sectional view of the tape cassette 41b in state where the front cover 31 is opened.

FIG. 21 is a perspective view illustrating the front cover 31, the top cover 34 and the cover 37 of a tape cassette 41b according to the third example of the present invention. FIG. 22 is a cross sectional view of the tape cassette 41b in a safe where the front cover 31 is closed. FIG. 23 is a cross sectional view of the tape cassette 41b in a state where the front cover 31 is opened.

As is shown in FIGS. 21 through 23, a construction of the front, top and rear covers 31, 34 and 37 is different from that of the first example in that the top cover 34 has a lengthy projection 70 extended in the tape stretching direction along the main portion 34b thereof. The projection 70 is provided so as to approach or contact the top face 20a of the top half 21 when the front cover 31 is opened.

In order to securely set the tape cassette 41b in a recording and reproducing apparatus, it is necessary to apply a downward pressing force on the top face 20a. Since the top cover 34 is above the top face 20a when the front cover 31 is opened, an area of the top face 20a where the pressing force can be applied is small. This considerably restricts a design for a mounting and dismounting mechanism of the recording and reproducing apparatus.

As is shown in FIG. 23, the top cover 34 is supported by the projection 70 without being deformed even when the top cover 34 is applied thereto. Accordingly, the pressing force can be applied at any point of a top face of the top cover 34 in a state of being above the top face 20a. Such a construction significantly enhances the designing freedom of the mounting and dismounting mechanism of the recording and reproducing apparatus.

In the third example, the projection 70 is provided on the top cover 34 according to the first example. Needless to say, the same effects can be obtained in a case when he projection 70 is provided on the top cover 53 according to the second example.

EXAMPLE 4

A tape cassette according to a fourth example of the present invention will be described with reference to the figures. Identical members with those of the first example bear identical reference numerals.

Figure 24:
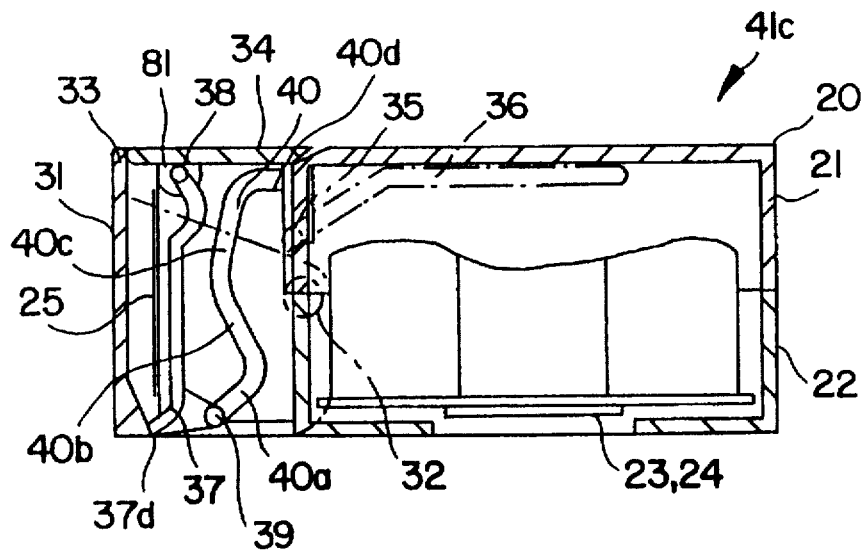
FIG. 24 is a cross sectional view of a tape cassette 41c according to a fourth example of the present invention in a state where the front cover 31 is closed.
Figure 25:
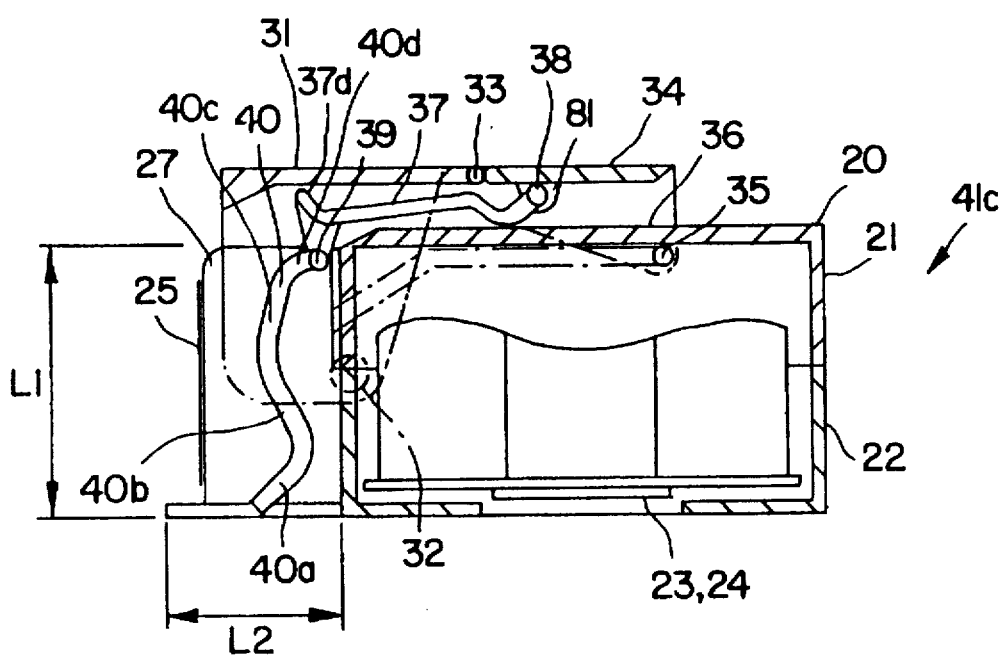
FIG. 25 is a cross sectional view of the tape cassette 41c in a state where the front cover 31 is opened.

FIG. 24 is a cross sectional view of a tape cassette 41c in a state where the front cover 31 is closed. FIG. 25 is a cross sectional view of the tape cassette 41c in a state where the front cover 31 is opened.

As is shown in FIGS. 24 and 25, the guide grooves 40 are formed at inner surfaces of the tape guides 27 and 28 (only 27 is shown in FIG. 25). Each guide groove 40 includes a first slanting section 40a diagonally raised rearward from a front bottom end of the housing 20, a second slanting section 40b adjoining the first slanting section 40a and is diagonally raised forward, a third slanting section 40c adjoining the second slanting section 40b and is diagonally raised rearward, and a horizontal section 40d adjoining the third slanting section 40c and is horizontally extended rearward. Each guide groove 40 has the upper tip thereof at such a position that allows the rear cover 37 to be positioned in the vicinity of or on the top face 20a of the top half 21 in a state where the front cover 31 is opened.

The front cover 31 and the top cover 34 are connected to each other in the following manner. End portions of the front and the top covers 31 and 34 opposed to each other each have, for example, a semi-cylindrical cutout portion, and in a state where the front and the top covers 31 and 34 are assembled, a support pin 33 is inserted into a cylindrical hole thus formed. Accordingly, the front cover 31, the top cover 34, and the support pins 33 are positioned on an identical plane when being above the top face 20a.

In the tape cassette 41 according to the first example, the front cover 31 has the projection 31b in order to fill the gap between the front cover 31 and the top cover 34 in a state where the front cover 31 is closed. In order to accommodate the projection 31b, it is necessary to bend the rear cover 37 to form a recess 37a as is shown in FIGS. 7 and 8. The total height of the tape cassette 41 in a state where the front cover 31 is opened is increased by the vertical height of the recess 37a. In the fourth example, in contrast, since the tape cassette 41c has no such projection 31b.

Since the front cover 31, the top cover 34, and the support pin 33 are placed on an identical plane as described above and further since the projection 31b is eliminated, the height of the portion above the top face 20a is significantly reduced, practically to approximately the thickness of the front cover 31 or the top cover 34.

The rear cover 37 has a projection 37d projecting forward at a bottom portion thereof. During the opening operation of the front cover 31, the projection 37d moves away from the rear face of the magnetic tape 25 in association with the sliding of the guide pins 39 along the first slanting section 40a, in order to stay out of contact from the magnetic tape 25. Then, the rear cover 37 moves to above the top face 20a.

In the tape cassette 41c according to the fourth example, a length L1 of the front opening 29 is larger than a length L2 of the bottom opening 30. If the conventional guide grooves 17 are used for such a tape cassette 41c, it is impossible for the rear cover 37 to move to above the top face 20a since the rear cover 37 contacts a front top edge of the top half 21. The second slanting section 40b diagonally raised forward allows the rear cover 37 to move to above the top face 20a without contacting the top half 21. By providing the guiding grooves 40 as shown in FIGS. 24 and 25, even the tape cassette 41c in which the length L1 of the front opening 26 is longer than the length L2 of the bottom opening 30 can be formed into a compact shape having a small thickness in a state where the front cover 31 is opened.

Figure 26:
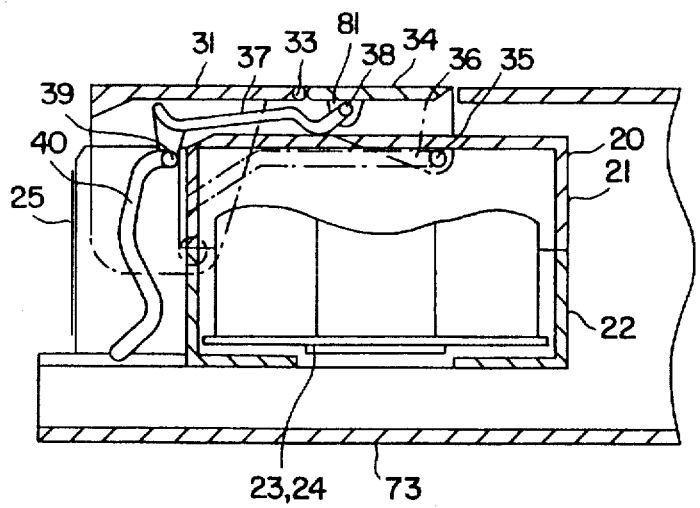
FIG. 26 is a cross sectional view of the tape cassette 41c accommodated in an adaptor 73.

FIG. 26 shows a small tape cassette which is smaller than a cassette having a size conforming to a recording and reproducing apparatus and accommodated in an adaptor 73. The tape cassette in FIG. 26 has the same construction as that of the tape cassette 41c. That is, the front cover 31 and the top cover 34 constitute a flat surface when being above the top face 20a. Further, a top face constituted by the front and the top covers 31 and 34 and a top face of the adaptor 73 constitutes a flat face with no concaved or convexed portions. This solves a problem that the adaptor 73 is hooked by the recording and reproducing apparatus during the mounting and dismounting operation.

Figure 27:
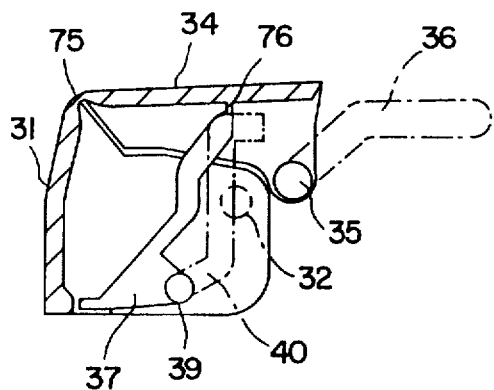
FIG. 27 is an enlarged cross sectional view of a tape cassette according to a modification of the fourth example in a state where the front cover 31 is closed.
Figure 28:
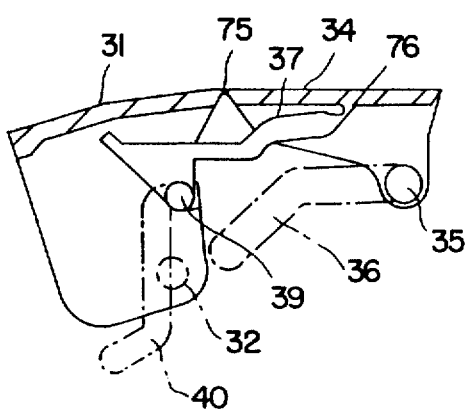
FIG. 28 is an enlarged cross sectional view of the tape cassette shown in FIG. 27 in a state where the front cover 31 is opened.

In the first example, the front, top and rear covers 31, 34 and 37 are pivotally connected to each other through the support pins 33 and 38. It is also possible that, as is shown in FIGS. 27 and 28, both of the connections between the front and the top covers 31 and 34 and between the top and the rear covers 34 and 37 or either one of the connections is performed by integral formation using a resin. In more detail, the front and the top covers 31 and 34 are connected through a hinge 75 therebetween, and the top and the rear covers 34 and 37 are connected through a hinge 76.

Such a connection through a hinge may also be used in the second example.

EXAMPLE 5

A tape cassette according to a fifth example of the present invention will be described with reference to the figures. Identical members with those of the fourth example bear identical reference numerals.

Figure 29:
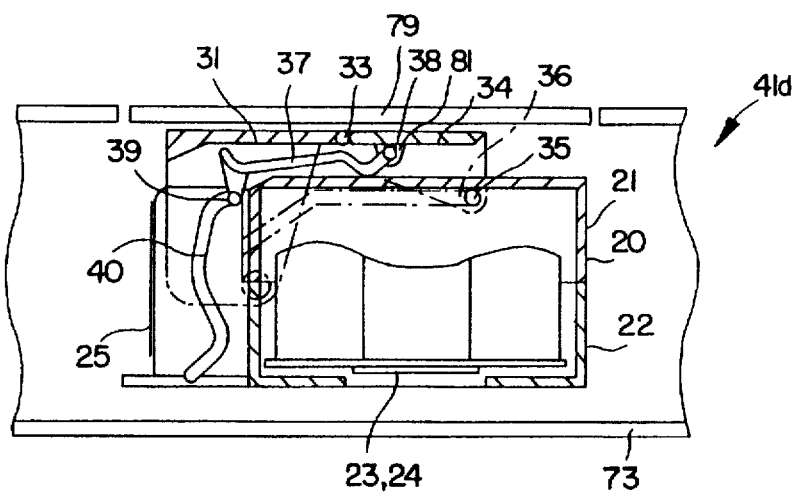
FIG. 29 As a cross sectional view of a tape cassette 41d according to a fifth example of the present invention accommodated in an adaptor 73.
Figure 30:
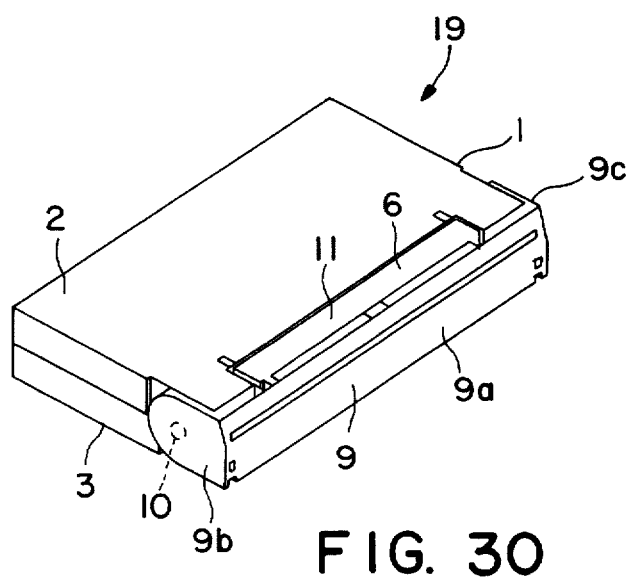
FIG. 30 is a perspective view of a conventional tape cassette 19 in a state where a front cover 9 is closed.
Figure 31:
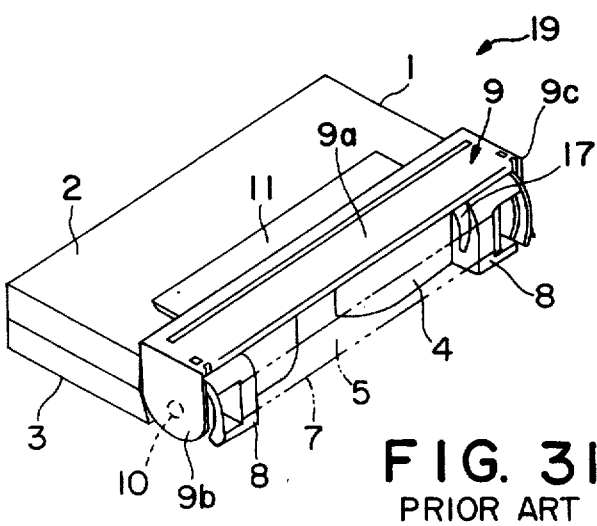
FIG. 31 is a perspective view of the tape cassette 19 in a state where the front cover 9 is opened.
Figure 32:
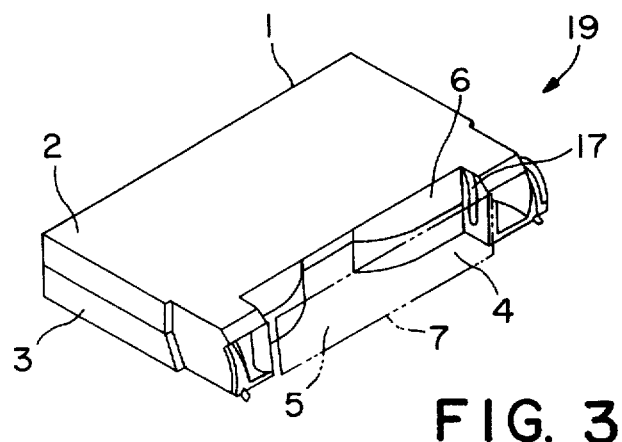
FIG. 32 is a perspective view of a housing 1 of the tape cassette 19 with covers thereof being omitted.
Figure 33:
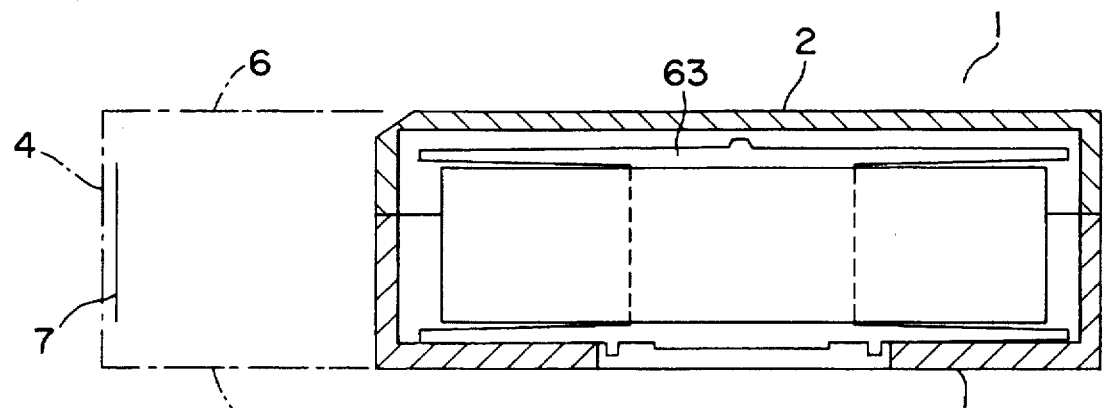
FIG. 33 is a cross sectional view of the housing 1 with the covers thereof being omitted.
Figure 34:
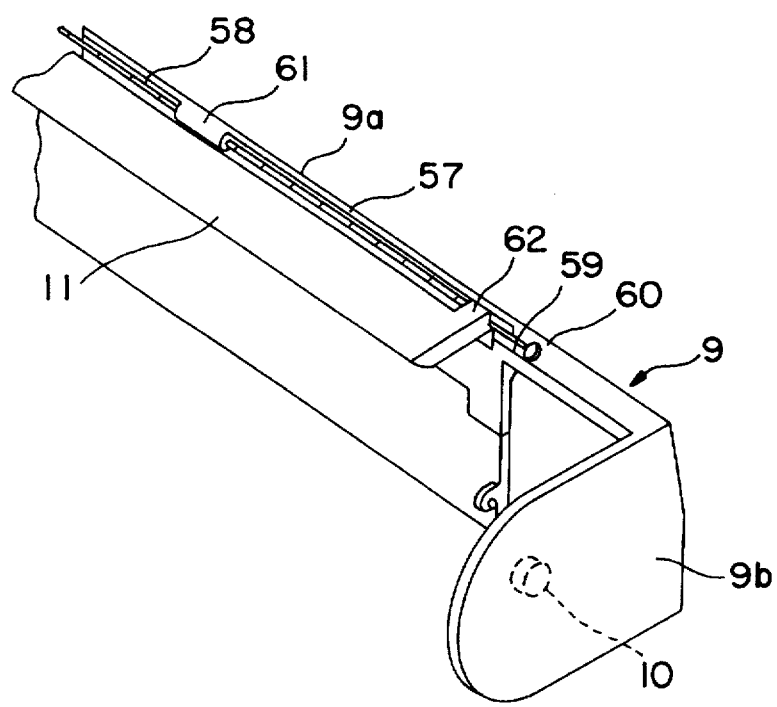
FIG. 34 is a perspective view of the front cover 9 and the top cover 11.
Figure 35:
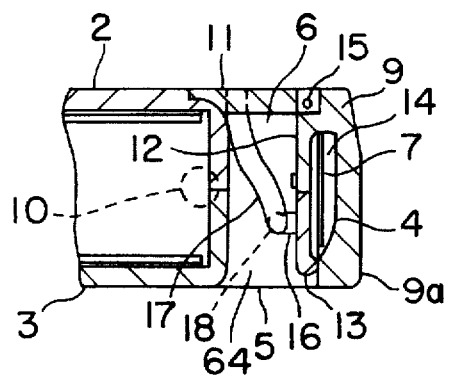
FIGS. 35 through 37 are views illustrating an operation for opening the front cover 9.
Figure 36:
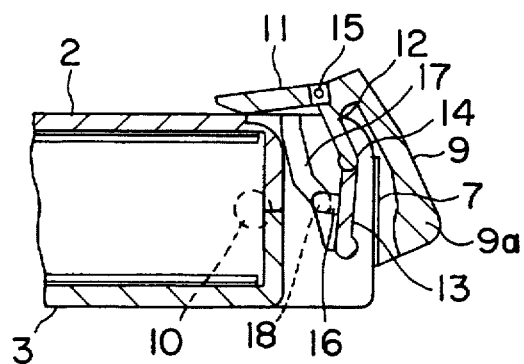
Figure 37:
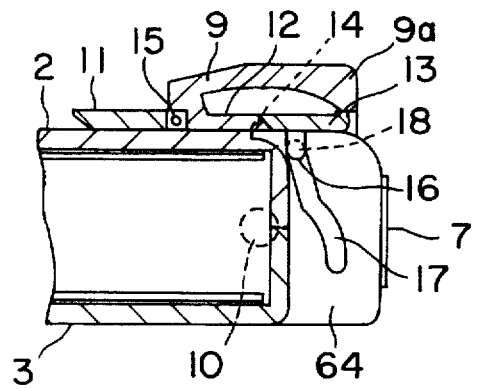
Figure 38:
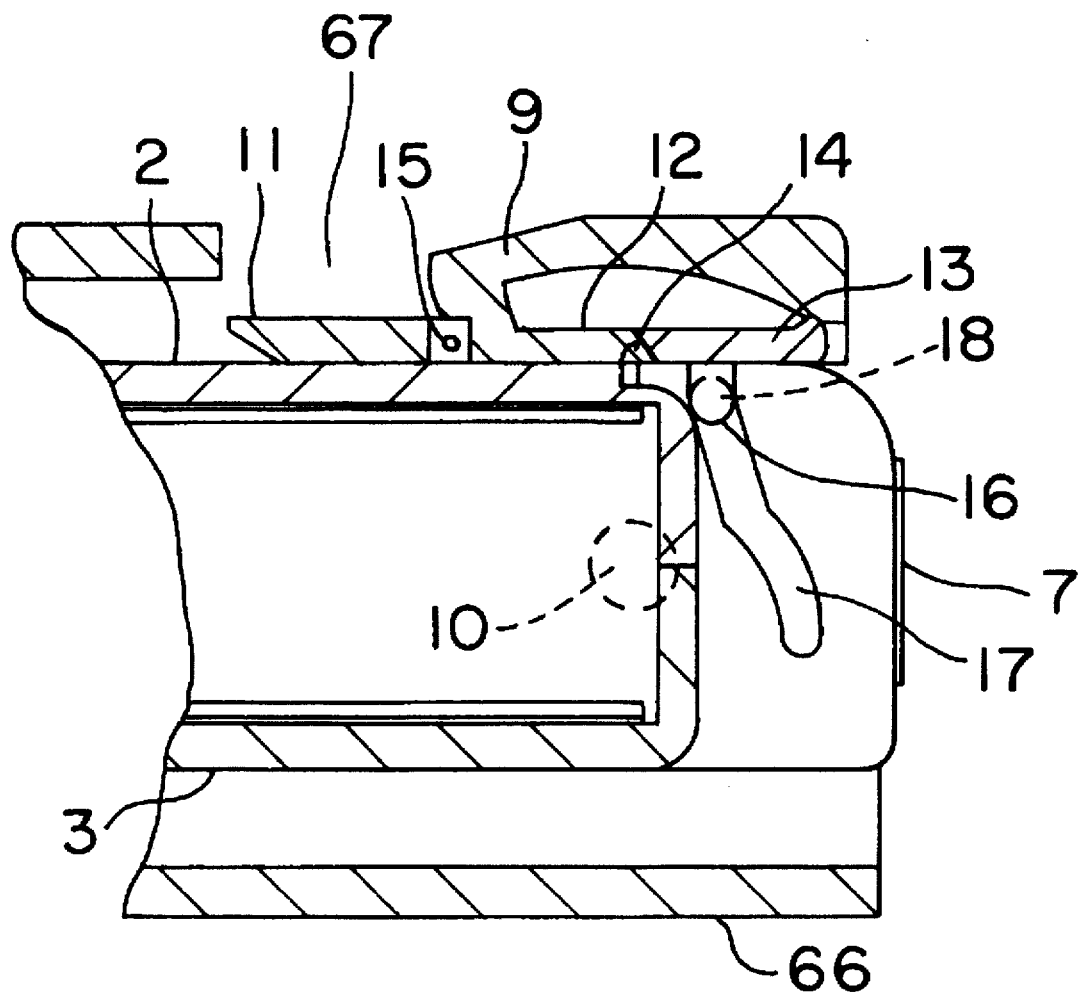
FIG. 38 is a cross sectional view of an adaptor 66 accommodating the tape cassette 19.

FIG. 29 is a cross sectional view of a tape cassette 41d accommodated in the adaptor 73.

As is shown in FIG. 29, in the tape cassette 41d as in the tape cassette 41c, the front cover 31, the top cover 34 and the support pins 33 constitute a flat face when being above the top face 20a. Further, the projection 31b provided in the tape cassette 41 is eliminated. For these reasons, the height of the portion above the top face 20a is significantly reduced, practically to approximately the thickness of the front cover 31 or the top cover 34 according to the fifth example.

In FIG. 29, the tape cassette 41d is accommodated in the adaptor 73, and the adaptor 73 has a lid 79 which is opened for taking out the tape cassette 41d. The lid 79 is provided in order to prevent the tape cassette 41d from dropping when the adaptor 73 is turned upside down.

Due to front and the top cover 31 and 34 constituting a flat face, the adaptor 73 for accommodating the tape cassette 41d can be reduced in size, especially in height.

In the first, third, fourth and fifth examples, the guide grooves 36 and 40 are formed in the housing 20. The guide grooves 36 may be formed at the top cover 34, in which case the guide pins 35 are formed on the housing 20. The guide grooves 40 may be formed at the rear cover 37, in which case the guide pins 39 are formed on the housing 20.

In a state where a tape cassette is accommodated in the adaptor 73, if the height of the tape cassette is too large to have a sufficient distance from an upper face of the adaptor 73, an upper face of the tape cassette is located in he vicinity of the upper face of the adaptor 73 so as to prohibit the attachment of =he lid 79. In this case, there is a possibility that the tape cassette drops when the adaptor 73 is turned upside down.

According to the fifth example, the height of the tape cassette 41d is smaller than that of the cassette 41. Thus, the tape cassette 41d can be accommodated in the adaptor 73 with a sufficient vertical space and thus allows the lid 79 to be provided, thereby reliably prohibiting he tape cassette 41d from dropping.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A tape cassette, comprising:

a housing accommodating a pair of tape reels around which a tape is wound, the housing having a front opening at a front face where the tape is exposed in a state of being stretched, and a bottom opening and a top opening which adjoin the front opening;

a front cover moving between a closed position opposed to a front face of the tape in the state of being stretched for covering the front opening and an open position for uncovering the front opening;

a rear cover moving between a closed position opposed to a rear face of the tape in the state of being stretched for covering the tape and an open position for exposing the tape;

a top cover connected to the front cover and to the rear cover and moving between a closed position for covering the top opening and an open position for uncovering the top opening;

first restricting means for controlling the front cover so as to move along a first locus;

second restricting means for controlling the rear cover so as to move along a second locus in association with the movement of the front cover; and third restricting means for controlling the top cover so as to move along a third locus in association with the movement of the front cover, the third restricting means including a first guide groove formed at both sides of the housing, and a first guide member formed at both sides of the top cover, the first guide member slidably engaging the first guide groove, and wherein the housing is provided with a pair of projections at a front face thereof, by which the tape is stretched between, the second restricting means including a second guide groove formed at inner surfaces of the projections of the housing and a second guide member formed at both sides of the rear cover, the second guide member slidably engaging the second guide groove.

2. A tape cassette according to claim 1, wherein an end of the front cover is pivotally connected with an end of the top cover, and an end of the rear cover is pivotally connected to an area in the vicinity of a central portion of the top cover.

3. A tape cassette according to claim 1, wherein the first restricting means pivotally connects the front cover to the housing.

4. A tape cassette according to claim 1, wherein the second guide groove includes a slanting section diagonally raised rearward away from the front opening and a vertical section adjoining the slanting section and vertically extended upward.

5. A tape cassette according to claim 4, wherein the second guide groove has the upper tip thereof at such a position that allows the rear cover to be positioned in an area in the vicinity of a top face of the housing including a position on the top face in a state where the front cover is at the open position.

6. A tape cassette according to claim 4, wherein the second guide groove includes a horizontal section adjoining the vertical section and horizontally extended rearward.

7. A tape cassette according to claim 1, wherein the first guide groove has a slanting section diagonally raised rearward away from the front opening and a horizontal section adjoining the slanting section and horizontally extended rearward.

8. A tape cassette according to claim 7, wherein the first guide groove has the upper tip thereof at such a position that allows the top cover to be positioned in an area in the vicinity of a top face of the housing including a position on the top face in a state where the front cover is at the open position.

9. A tape cassette according to claim 1, wherein the front cover has a first projection projecting rearward from a tip of the front cover, the rear cover has a second projection projecting forward from a tip of the rear cover, and the first projection and the second projection are in pressure contact with each other in a state where the front cover is in the closed position.

10. A tape cassette according to claim 1, wherein the top cover has a projection to be positioned in an area in the vicinity of a top face of the housing in a state where the front cover is at the open position.

11. A tape cassette according to claim 1, wherein the first guide groove has a first slanting section diagonally raised rearward away from the front opening, a second slanting section adjoining the first slanting section and diagonally raised forward so as to approach the front opening, and a third slanting section adjoining the second slanting section and diagonally raised rearward away from the front opening.

12. A tape cassette according to claim 1, wherein the front cover and the top cover are parallel to a top face of the housing and positioned on the same plane in a state where the front cover is at the open position.

13. A tape cassette according to claim 1, wherein the front cover and the top cover are pivotally connected with each other through a support pin, and the support pin is positioned on each central plane of the front cover and the top cover.

14. A tape cassette according to claim 1, wherein the front cover, the top cover and the rear cover are integrally formed with each other and pivotally connected to each other through a flexible connection portion.

15. A tape cassette, comprising:

a housing accommodating a pair of tape reels around which a tape is wound, the housing having a front opening at a front face where the tape is exposed in a state of being stretched, and a bottom opening and a top opening which adjoin the front opening;

a front cover moving between a closed position opposed to a front face of the tape in the state of being stretched for covering the front opening and an open position for uncovering the front opening;

a bottom cover moving between a closed position for sealing an inside space of the tape cassette including the front opening, the top opening and the bottom opening and an open position for opening the inside space;

a top cover connected to the front cover in a portion of the top cover and to the bottom cover in another portion of the top cover and moving between a closed position for covering the top opening and an open position for uncovering the top opening;

first restricting means for controlling the front cover so as to move along a first locus;

second restricting means for controlling the bottom cover so as to move along a second locus in association with the movement of the front cover;

first connecting means for pivotally connecting the top cover and the front cover; and second connecting means for pivotally connecting the top cover and the bottom cover, and wherein the second restricting means is provided at a side end of the bottom cover for pivotally connecting the bottom cover to the housing, and the top cover moves in association with the pivotal movement of the bottom cover about the second restricting means.

16. A tape cassette according to claim 15, wherein the bottom cover includes a first plate, a second plate and a third plate which each has one end radially connected to a central point.

17. A tape cassette according to claim 16, wherein the first plate has the second restricting means at both sides of a tip thereof.

18. A tape cassette according to claim 16, wherein the second plate has the second connecting means at both sides of a tip thereof.

19. A tape cassette according to claim 16, wherein the third plate has a tip which is positioned in the vicinity of a bottom end of the front cover in a state where the front cover is at the closed position.

20. A tape cassette according to claim 16, wherein the first and the third plates seal the inside space.

21. A tape cassette according to claim 15, wherein a bottom face of the bottom cover and a bottom face of the housing constitute a flat face.

* * * * *

UNITED STATES PATENT AND TRADEMARK OFFICE
CERTIFICATE OF CORRECTION

PATENT NO. : 5,541,795
DATED : July 30, 1996
INVENTOR(S) : Hirabayashi et al.

It is certified that error appears in the above-indentified patent and that said Letters Patent is hereby corrected as shown below:

Column 3, line 59, and column 5, line 16, delete "X4-X4" and insert --4-4--.

Column 14, line 41, delete "first" and insert therefor --second--.

Signed and Sealed this

Fourth Day of February, 199

*Attest:*

BRUCE LEHMAN

*Attesting Officer*  *Commissioner of Patents and Trademarks*